March 3, 1959 — D. L. SHELLY — 2,875,786
PULSATION DAMPENER DEVICE
Filed Nov. 25, 1955

INVENTOR.
Dewitt L. Shelly
BY
ATTORNEY

United States Patent Office 2,875,786
Patented Mar. 3, 1959

2,875,786

PULSATION DAMPENER DEVICE

Dewitt L. Shelly, Pittsburgh, Pa., assignor to Westinghouse Air Brake Company, Wilmerding, Pa., a corporation of Pennsylvania Application November 25, 1955, Serial No. 548,870

1 Claim. (Cl. 138—30)

This invention relates to pulsation dampening and surge absorbing apparatus used in pipe lines and piping systems, such as those carrying fluids of various chemical compositions under pressure, and more particularly to apparatus of such a type which includes resilient means adapted to change its position to accommodate temporary increases in a fluid volume resulting from momentary surges and pulsations of pressure.

Prior art devices having resilient members, for example, resilient sleeves composed of rubber or other similar material, are well known but have a number of short-comings and disadvantages. Such a resilient sleeve is subject to chemical attack by the fluid in the line, and is also subject to mechanical stresses resulting from circumferential expansion and contraction, from frictional contact with a supporting member or mandrel, and from frictional contact with an enclosing cylinder or housing wall which surrounds the resilient sleeve in sealed engagement therewith to form a chamber into which other fluid, for example, compressed air, is introduced for applying a pressure to the outside of the resilient sleeve, to assist it in forcing fluid back into the line during the rarefactions or dips in pressure below normal which usually follow the surges. Furthermore, during these rarefactions, the sleeve may be forced against the mandrel, sharp folds occurring in it, or during surges it may be stretched beyond its limit of elasticity so that it does not return to normal size and shape after the surge has passed.

It has heretofore proved difficult, if not impossible, to find a suitable sleeve material which would have the necessary resistance to chemical action, for example, the chemical action of hot oil, and the necessary resiliency and strength to provide long life under the physical conditions of stress and friction heretofore mentioned.

The apparatus of the instant invention overcomes these and other disadvantages of the prior art by the use of resilient sleeve means having two concentric sleeve portions, the inner sleeve portion in contact with the fluid in the line being especially constructed to be chemically resistant to the fluid, the outer sleeve portion having high resiliency and strength. A bonding material, or a reinforcing fabric, may be used between inner and outer sleeves, if desired. A lubricant is used between the sleeves in one embodiment of the invention.

Accordingly, a primary object of the invention is to provide new and improved pulsation dampening and surge absorbing apparatus.

Another object is to provide new and improved pulsation dampening and surge absorbing apparatus of the type in which resilient means changes its position or volume as fluid flows into the member when a pressure surge occurs, to thereby provide for dampening the surge.

Another object is to provide new and improved pulsation dampening and surge absorbing apparatus which is characterized by long and trouble-free life.

Still another object is to provide pulsation dampening and surge absorbing apparatus having new and improved resilient sleeve means for use therein.

A further object of the invention is to provide new and improved resilient sleeve means for use in pulsation dampening and surge absorbing apparatus.

Still a further object is to provide new and improved resilient sleeve means having high chemical resistance and strength for use in pulsation dampening and surge absorbing apparatus.

Other objects and advantages will become apparent after a perusal of the accompanying specification when read in connection with the accompanying drawings in which.

Figure 1:
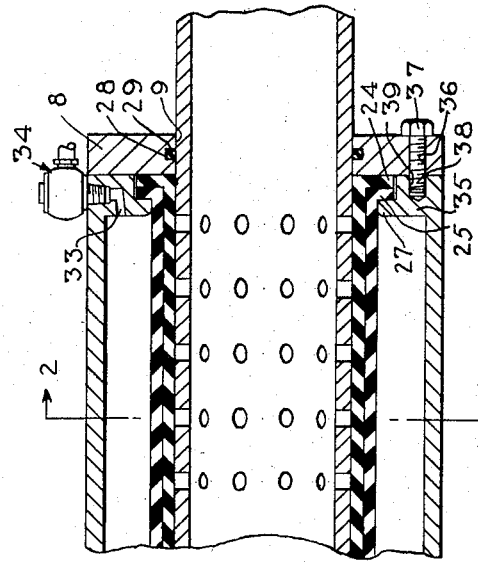
Fig. 1 is a cross-sectional view through the longitudinal axis of the preferred embodiment of the invention.

Referring now to the drawings for a more detailed understanding of the invention, and in which like reference characters are used throughout to designate like parts, there is shown a mandrel or perforated pipe section generally designated by the reference numeral 11. This mandrel or perforated pipe section may be connected in the fluid line in any convenient manner so that fluid, from which surges are to be removed, flows through the mandrel. For example, the member 11 may have threaded ends (not shown) for use with conventional pipe couplings.

Whereas for convenience of illustration only the embodiment of the invention is shown in which fluid flows through the device, it is to be understood that one end of the apparatus could be closed, as by a cap or other convenient means, and the other end connected to the fluid line by, for example, a T-joint.

The member 11 has a perforated portion which has therein a plurality of throttling orifices 12, which may be arranged in circumferentially-spaced rows. However, the invention is not to be limited to a device in which the orifices are arranged in rows. An end plate or end disc 13 has a bore or aperture 10 therein which fits snugly around the outside of member 11 and is suitably secured to one end thereof as by welding at 14.

Mounted upon the other end of member 11 is a second end plate or end disc 8 having a bore or opening 9 therein for snugly receiving the other end of member 11. End plate member 8 has an annular groove or recess 28 therein for receiving sealing ring 29. The other end plate 13 may, if desired, have a groove (not shown) for receiving a sealing ring (not shown).

The aforementioned end plate 13 has bores 16 therein for receiving bolts 15, the threaded ends 18 of bolts 15 making threaded engagement as shown in a threaded bore 17 in the flanged end 19 of a cylindrical casing or housing member 30. The other end of housing member 30 has an inwardly extending annular flange portion 35 having threaded bores 39 therein for receiving the threaded ends 38 of bolts 37 passing through bores 36 in the aforementioned end plate or end disc 8. The bolts 15 passing through the aforementioned end plate 13 and bolts 37 passing through the aforementioned end plate 8 securely fasten the end plates 13 and 8 to the ends of housing or cylinder 30 and further secure the housing and end plates in predetermined relative positions on member 11.

An inner resilient sleeve portion designated by the reference numeral 20 has flanged ends 22 and 24 as shown, the inner sleeve being composed of a substance which is highly resistant to chemical reaction with the fluid in the line, which may be heated oil, chemicals, food, or other matter. Disposed around the inner sleeve portion 20 is an outer sleeve portion 21 which it is to be understood has high strength and resiliency and which has flanged ends 23 and 25 as shown. The aforementioned flanged ends 19 and 35 of cylinder or housing 30 have extended annular lip portions 26 and 27 respectively which compress the flanged ends of both the inner and outer sleeves securely holding the sleeves in place on the mandrel and providing sealing engagement between the outer sleeve 21 and the housing member 30 and forming a chamber 40. The housing member 30 has bores 31 and 33 therein, bore 31 having operatively connected therein a pressure gauge generally designated by the reference numeral 32, and bore 33 having connected thereto a valve generally designated by the reference numeral 34 and a pipe line, a section of which is shown, for bringing fluid under pressure, for example, compressed air, into the aforementioned chamber 40 formed between the inner wall of casing or housing member 30 and the outer sleeve 21, the compressed air providing a pressure on the outside of sleeve 21, and assisting in the discharge of fluid back into the line after the surges and peaks of pressure have subsided.

In another embodiment of the invention, a suitable lubricant such for example as graphite (not shown) is disposed between the outer surface of sleeve 20 and the inner surface of sleeve 21 to assist in reducing frictional contact between the two sleeves and resulting wear. If desired, a sleeve of reinforcing fabric, for example, nylon, may be disposed between the two sleeves 20 and 21 to enhance the useful life thereof.

Figure 3:
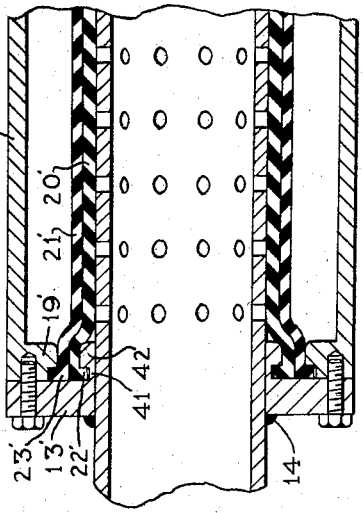
Fig. 3 is a partial view in section of a modification of the invention of Fig. 1.
Figure 2:
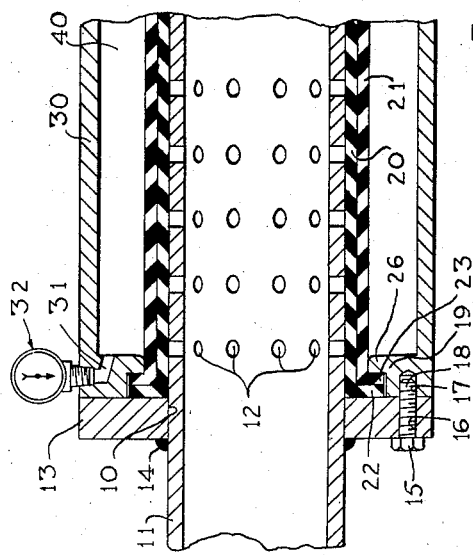
Fig. 2 is a cross-sectional view taken along the line 2—2 of Fig. 1.

Particular reference should be made now to Fig. 3 in which there is shown a modification of the apparatus of Fig. 1. It should be noted that the outer sleeve 21' of Fig. 3 has an outwardly flaring flanged end portion 23' whereas the inner sleeve 20' has an inwardly flaring flanged end 22'. The end plate or end disc 13' has an inwardly extending ring portion 41 with an annular lip 42, the flanges 22' and 23' being compressed in a manner similar to that hereinbefore described to provide sealing engagement with the adjacent housing portion of the apparatus.

The ratio between the area of the central passage in mandrel 11 and the total of the areas of all the throttling orifices may be that which is deemed most desirable, and this invention is not limited to any particular ratio.

Having now described the invention, what I claim as new and desire to secure by Letters Patent, is:

A resilient cylindrical sleeve member for use in hydraulic pulsation dampening devices of the type in which the sleeve member coaxially surrounds a cylindrical perforated mandrel within which is contained an hydraulic pressure medium and is anchored in sealed relation to the mandrel at its opposite ends and is subject on its outer face to a preselected fluid pressure for resisting surges of hydraulic pressure acting through the perforations of the mandrel on the inner surface of the sleeve member, said sleeve member being characterized in that it comprises an inner cylindrical sleeve portion of substantially uniform wall thickness and of a resilient material resistant to chemical action by the hydraulic pressure medium within the mandrel, and an outer cylindrical sleeve portion of substantially uniform wall thickness closely surrounding said inner sleeve portion in coaxial relation thereto, said outer sleeve portion being of a resilient material inherently having resistance to stretching and distortion to a substantially higher degree than said inner sleeve portion so as to support the inner sleeve portion against undesired stretching and distortion responsively to hydraulic pressure acting thereon, said inner and outer sleeve portions having a lubricant therebetween to minimize friction incidental to relative movement thereof as expansion and contraction of the sleeve member occurs.

References Cited in the file of this patent

UNITED STATES PATENTS

| | | |
|---|---|---|
| 2,278,688 | Caminez | Apr. 7, 1942 |
| 2,532,143 | Breit | Nov. 28, 1950 |
| 2,690,769 | Brown | Oct. 5, 1954 |
| 2,690,901 | McCormack | Oct. 5, 1954 |
| 2,712,831 | Day | July 12, 1955 |